(12) United States Patent
Atamert et al.

(10) Patent No.: US 12,525,780 B2
(45) Date of Patent: Jan. 13, 2026

(54) METHOD FOR RESTORING SUPERCONDUCTIVITY OF AN MgB2 WIRE

(71) Applicants: NV BEKAERT SA, Zwevegem (BE); EPOCH WIRES LIMITED, Cambridge (GB)

(72) Inventors: Serdar Atamert, Cambridge (GB); Mehmet Kutukcu, Cambridge (GB); Chris D'Hulst, Oeselgem (BE); Jan Mestdagh, Harelbeke (BE)

(73) Assignees: NV BEKAERT SA, Zwevegem (BE); EPOCH WIRES LIMITED, Cambridge (GB)

( * ) Notice: Subject to any disclaimer, the term of this patent is extended or adjusted under 35 U.S.C. 154(b) by 198 days.

(21) Appl. No.: 18/577,049

(22) PCT Filed: Jul. 4, 2022

(86) PCT No.: PCT/EP2022/068372
§ 371 (c)(1),
(2) Date: Jan. 5, 2024

(87) PCT Pub. No.: WO2023/280739
PCT Pub. Date: Jan. 12, 2023

(65) Prior Publication Data
US 2024/0322460 A1    Sep. 26, 2024

(30) Foreign Application Priority Data

Jul. 6, 2021  (EP) ..................... 21250004

(51) Int. Cl.
*H01R 4/68* (2006.01)
*H02G 1/14* (2006.01)
(Continued)

(52) U.S. Cl.
CPC ............... *H02G 15/18* (2013.01); *H01R 4/68* (2013.01); *H02G 1/14* (2013.01); *H10N 60/0856* (2023.02)

(58) Field of Classification Search
CPC . H01R 4/68; H02G 1/14; H02G 15/18; H10N 60/0856; H10N 60/80; H10N 60/01; Y02E 40/60
(Continued)

(56) References Cited

U.S. PATENT DOCUMENTS

2009/0105079 A1   4/2009   Leghissa
2012/0061139 A1   3/2012   Bianchetti et al.

FOREIGN PATENT DOCUMENTS

CN    107887077 A  *  4/2018  ............. H01B 13/00
KR    101 343 887      12/2013
KR    2020-0103369      9/2020

OTHER PUBLICATIONS

MgB2 Superconductors for Magnetic Applications_Weeren_1 to 236_Jun 2007.*

(Continued)

*Primary Examiner* — Timothy J Thompson
*Assistant Examiner* — Guillermo J Egoavil
(74) *Attorney, Agent, or Firm* — Wenderoth, Lind & Ponack, L.L.P.

(57) ABSTRACT

A method for restoring superconductivity of a wire having a core of reacted $MgB_2$ comprises subjecting said wire to a two-phase heat treatment, wherein a first phase comprises heating in a range of 800° C. to 1000° C. during 20 minutes to 40 minutes and a second phase comprises heating in a range of 550° C. to 750° C. during 45 minutes to 75 minutes.

8 Claims, 1 Drawing Sheet

(51) Int. Cl.
  *H02G 15/18* (2006.01)
  *H10N 60/01* (2023.01)
(58) Field of Classification Search
  USPC .................................................. 174/125.1
  See application file for complete search history.

(56) References Cited

OTHER PUBLICATIONS

Heat Treatment Profiles Multifilamentary MgB2 Superconducting Wire_Silva et al._ 1 to 5_Aug 2019.*
Effect of Two-Stage Heat Treatment for MgB2 Tapes_Miura et al. 2810 to 2813_Jun 2007.*
Study on the Formation of MgB2 Phase_Feng et al._41 to 46_2004.*
Fabrication and properties of dense ex situ MgB2_Dancer et al._ 1 to 7_Aug 2009.*
Connectivity, Doping, and Anisotropy in Highly Dense MgB2_Li_1 to 213_2015.*
Superconducting MgB2 wire_Iranzo_1 to 222_2018.*
Kinetic analysis of MgB2 layer formation_Sumption et al._1 to 15_Sept 2016.*
An MgB2 Superconducting Joint_Tanaka et al._1 to 6_Dec 2020.*
MgB2 Superconducting Joint with Heat-Treatment_Tanaka et al._1 to 6_Dec 2020.*
Fast Creation of Dense MgB2 Phase in Wires_Kovac et al._1 to 7_Sep 2016.*
International Search Report mailed Dec. 13, 2022 in International Application No. PCT/EP2022/068372.
Written Opinion mailed Dec. 13, 2022 in International Application No. PCT/EP2022/068372.
Wilke et al., "Effects of neutron irradiation on carbon doped MgB2 wire segments," Superconductor Science and Technology, Apr. 26, 2006, 19(6):556, pp. 556-563 (30 pages), cited in ISR/WO.

\* cited by examiner

METHOD FOR RESTORING SUPERCONDUCTIVITY OF AN MgB2 WIRE

TECHNICAL FIELD

The invention relates to a method for restoring superconductivity of an MgB2 wire by subjecting the wire to a two-phase heat treatment.

BACKGROUND ART

Magnesium diboride is an inorganic compound with the formula $MgB_2$. Magnesium diboride's superconducting properties were discovered in 2001. $MgB_2$ becomes superconducting at 39 K (−234° C.), which is the highest operating temperature amongst conventional superconductors. This allows the functioning as superconductor without the need for using liquid helium.

In order to keep its superconducting properties, the very low electrical resistance must also be present at joints, where two ends of superconducting wire are joined. Having regard to the very fragile properties of the superconducting material, this is not a straightforward task.

The prior art has disclosed various alternatives for realizing a superconducting joint.

US-A1-2009/0105079 discloses a superconductive connection for two end pieces of superconductors using a sheath or bushing where $MgB_2$ as superconductive contacting material is inserted. The superconductors are multi-wire superconductors. The connection shows a region inside the sheath or bushing where the superconducting wires overlap, i.e. the cross-section shows the presence of superconducting wires coming from the two end pieces of superconductors.

KR-A-10-2020-0103369 discloses a superconductive connection for two end pieces of superconductors of the single wire type. The superconductor of the single wire type is a round wire with a $MgB_2$ superconducting core surrounded by a stabilization layer and a metal sheath. In order to realize the connection, the end pieces of the superconducting wires are flattened to a very large degree to increase the bonding area. The width to thickness ratio ranges from 3 to 100. The stabilization layer and metal sheath are removed at one side of the flattened ends so that the superconducting cores become open at one side. The open sides of the superconducting cores are then brought in contact with each other. The contacting ends are introduced in a bonding container where sintered powder of Mg and B or of $MgB_2$ is introduced and put under pressure.

DISCLOSURE OF INVENTION

The object of the invention is to provide a method of restoring superconductivity of a wire having a core of reacted $MgB_2$. The method comprises the following steps.
Subjecting the wire to a heat treatment of two phases:
1) a first phase of heating in a range of 800° C. to 1000° C. during 20 minutes to 40 minutes and
2) a second phase of heating in a range of 550° C. to 750° C. during 45 minutes to 75 minutes.

The mentioned heat treatment is appropriate to restore the superconductivity of a single wire with a $MgB_2$ core where the superconductivity was lost due to damage or other incident.

The mentioned heat treatment is also applicable to restore superconductivity in a plurality of single wires (cabled construction) or in a single wire with multiple $MgB_2$ cores (multifilament wire).

The mentioned heat treatment is valid to restore general defects entered into the MgB2 phase due to:
Jointing process
Handling damage (excessive tensioning/compressing during processing or winding of the wire)
Incidental/accidental damage (impact, heat, . . . on wire or wire assembly)

The method of restoring superconductivity can be applied to a wire having a core of reacted MgB2 that has been bent, flattened, or twisted.

The mentioned heat treatment to restore superconductivity is independent from the shape of the superconducting wire. Said superconducting wire can have a circular or shaped cross section.

This method can also be applied to restore superconductivity in a cable comprising a plurality of wires with a MgB2 core where the superconductivity was lost in one or more wires due to damage or other incident.

This method can also be applied to restore superconductivity in a joint of superconducting wires.

As an illustration to the application of the method of restoring superconductivity of a wire having a core of reacted MgB2, there is provided a joint of superconducting wires. The joint and method described below are not part of the invention.

The joint comprises at least two superconducting wires each with a sheath and with a $MgB_2$ superconducting core inside the sheath. At least one first superconducting wire has a first flattened end and at least one second superconducting wire has a second flattened end. The joint further comprises a tubular metal connector. The connector has a centre being filled with magnesium or boron or $MgB_2$ material. The first flattened end of first superconducting wire is inserted at one side of the connector until it is in contact with the magnesium or boron or $MgB_2$ material. The second flattened end of the second superconducting wire is inserted at the other side of the connector until it is also in contact with the magnesium or boron or $MgB_2$ material. The connector is pressed at both sides to fix the first superconducting wire and the second superconducting wire. The centre of the connector is pressed to compact the magnesium or boron or $MgB_2$ material.

This joint does not need the superconducting wires to have an overlap. In addition, there is no need to remove the sheath of the superconducting wires.

The first flattened end and the second flattened end have a width-to-thickness ratio in order to get rid of the cavities and to provide a stable pressed wire that is no longer deformed during pressing of the connector. Preferably these flattened ends have a width to thickness ratio ranging from 1.1 to 10.0, preferably from 1.1 to 5.0, e.g. from 1.25 to 2.5, preferably from 1.50 to 2.0.

Since the first superconducting wire and the second superconducting wire comprise a core of reacted superconducting $MgB_2$ they also comprise voids. The reason is that the volume of reacted $MgB_2$ is roughly 25% less than the original Mg powders and B powders. The ends of the superconducting wires are pressed to such a degree that the number and volume of voids decrease. Later pressing of these already pressed ends of superconducting wires will no longer lead to large cracks which prevent electrical current.

The tubular metal connector preferably comprises low carbon steel.

The tubular metal connector may also comprise titanium.

The tubular metal connector may have a titanium barrier radially inside and a low carbon steel radially outside.

The tubular metal connector may preferably be made of low carbon steel only.

There is provided a method of joining at least two superconducting wires having a superconducting core of reacted $MgB_2$. This method comprises the following steps:
a) providing at least one first superconducting wire and at least one second superconducting wire, the first superconducting wire having a first end and the second superconducting wire having a second end;
b) flattening the first end of the first superconducting wire and flattening the second end of the second superconducting wire;
c) providing a tubular metal connector having a length $L_{tot}$ and having a centre;
d) filling the centre of said connector with unreacted Mg powder and B powder;
e) flattening the connector in case the connector has an original circular cross-section;
f) inserting the first end of the first superconductor at one side in the connector over a length $L_1$ until contact with the Mg powder and B powder;
g) inserting the second end of the second superconductor at the other side in the connector over a length $L_2$ until contact with the Mg powder and B powder;
h) pressing the connector at both sides to fix the first superconductor wire and the second superconductor wire in the connector;
i) pressing the centre of the connector over a length $L_{center}$ to compact the Mg powder and B powder, wherein the lengths $L_{tot}$, $L_1$, $L_2$ and $L_{center}$ matching following equation:

$$L_{tot} = L_1 + L_2 + 2xL_{cr} + L_{center}$$

where $L_{cr}$ is a critical distance between, on the one hand, the first flattened end and the second flattened end, and, on the other hand, the pressed length Lcenter of the centre of the connector needed to avoid that the superconducting wires are pressed together with the pressing of the centre.

Preferably the flattening of the ends of the superconducting wires are done to a degree where the width to thickness ratios of these ends range from 1.10 to 10.0, preferably from 1.10 to 5.0, most preferably from 1.50 to 2.5, e.g. from 1.50 to 2.0.

Preferable values of the critical distance Lcr range from 0.6 mm to 5.0 mm, preferably from 0.8 mm to 2.0 mm, e.g. from 0.8 mm to 1.2 mm.

To create superconductivity within the tubular metal connector and to restore the superconductivity in the flattened ends, the tubular metal connector and the flattened ends are subjected to a heat treatment. It is a second object of the invention to provide the heat treatment to recover superconductivity in a joint of superconducting wires.

This heat treatment preferably comprises two phases:
1) a first phase of heating in a range of 800° C. to 1000° C. during 20 minutes to 40 minutes; immediately followed by
2) a second phase of heating in a range of 550° C. to 750° C. during 45 minutes to 75 minutes.

BRIEF DESCRIPTION OF FIGURES IN THE DRAWINGS

MODE(S) FOR CARRYING OUT THE INVENTION

Figure 1:
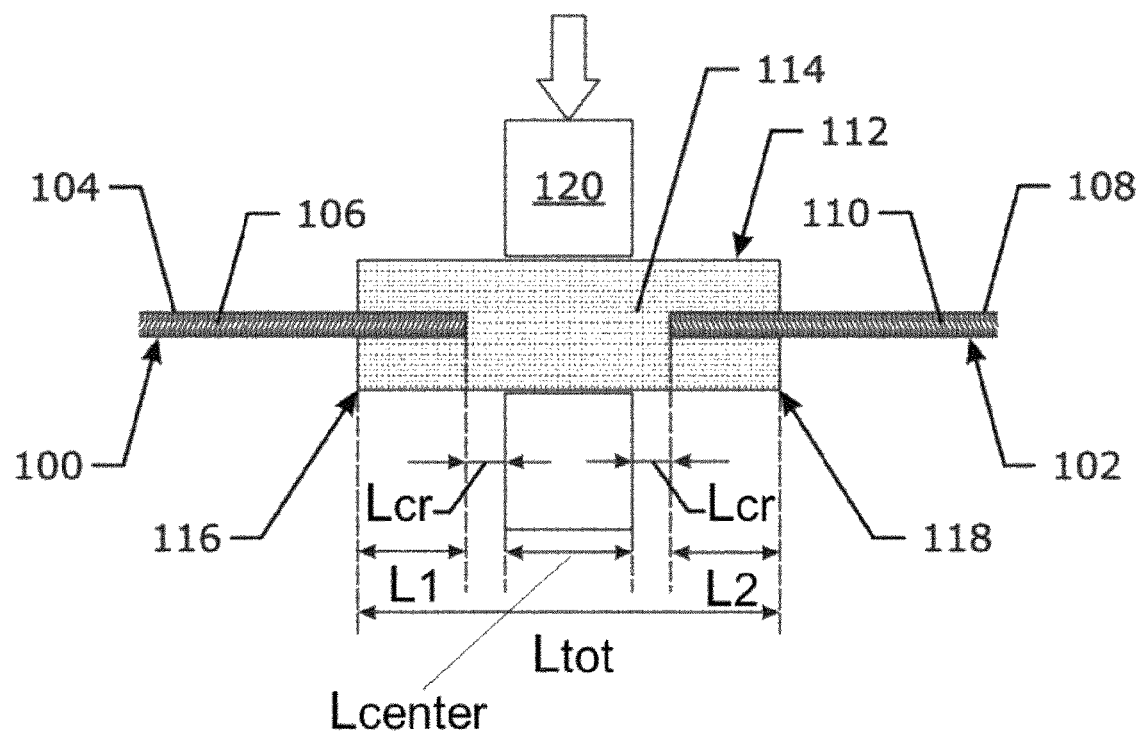
FIG. 1 is a schematic presentation of a preparation of a joint submitted to the heat treatment according to the invention.

Referring to FIG. 1 the subsequent steps or joining a first superconducting wire 100 and a second superconducting wire 102 will be described. The numerical values are given by way of non-limiting example.

The first superconducting wire 100 has a sheath 104 of low carbon steel and a core 106 of reacted $MgB_2$.

The second superconducting wire 102 has a sheath 108 with a barrier layer of titanium and an outer layer of low carbon steel and a core 110 of reacted $MgB_2$.

A tubular metal connector 112 is provided and contains unreacted boron powder and magnesium powder. The boron powder is preferably a nano boron powder and the magnesium powder is preferably a spherical magnesium powder. By way of example, the external diameter of the tubular metal connector 112 is 5.6 mm to 6.0 mm and the metal tubular connector 112 is about 22 mm long.

The first end 116 and the second end 118 of the metal tubular connector 112 are first deburred.

Then, the first end 116 of the tubular metal connector 112 and the second end 118 of the tubular metal connector are immersed in a diluted HCl solution for a couple of seconds and thereafter dried under vacuum.

Both the first and 116 and the second end 118 are polished followed by alcohol washing and vacuum drying.

A hole of 1.25 mm is drilled in both the first end 116 and the second end 118 to match the dimensions of the first and the second superconducting wires 100 and 102. The length of the hole is $L_1$ at the sided of the first end 116 and $L_2$ at the side of the second end 118. Both $L_1$ and $L_2$ can be about 6.5 mm.

After drilling, the tubular metal connector 112 is flattened over its whole length $L_{tot}$.

The first superconducting wire 100 and the second superconducting wire are flattened over a length that is greater than the drilling lengths $L_1$ and $L_2$.

The thus flattened ends of the first and second superconducting wire 100 and 102 are ground with an angle in order to increase the surface area. This grinding operation is again followed by alcohol washing and vacuum drying. Thereafter, the flattened ends of the first and second super-conducting wires 100 and 102 dipped in a diluted solution of HCl, followed by washing in alcohol and drying in vacuum.

The flattened ends of the first and second superconducting wires 100 and 102 are inserted in the tubular metal connector 112 until they have contact with the boron and magnesium powder in the centre.

Pressure is exercised at both ends 116 and 118 of the tubular metal connector 112 in order to fix the superconducting wires 100 and 102 and to seal the ends 116 and 118.

The centre part of the tubular metal connector 112 is pressed over a length $L_{center}$ by means of a hydraulic press 120. The length $L_{center}$ before flattening is for example 6.35 mm.

A critical length $L_{cr}$ of 1.0 mm remains at both sides between the flattened centre part of the tubular metal connector 112 and the drilled holes.

Finally, a heat treatment is applied to the assembly of the first and second superconducting wires 100, 102 and the tubular metal connector 112 with the Mg and B powder 114.

As mentioned, the heat treatment comprises two phases.

During the first phase the assembly is heated at 900° C. during 30 minutes. In this first phase, the following reaction takes place:

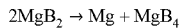
$$2MgB_2 \rightarrow Mg + MgB_4$$

During the second phase immediately following the first phase, the assembly is kept at a temperature of 650° C. during 60 minutes. During this second phase, the following reaction takes place:

$$Mg + MgB_4 \rightarrow 2MgB_2$$

This double phase heat treatment not only create superconductivity in the centre of the tubular metal connector 112 but also restores the superconductivity in the flattened ends of the first and second superconducting wires 100 and 102.

Figure 2:
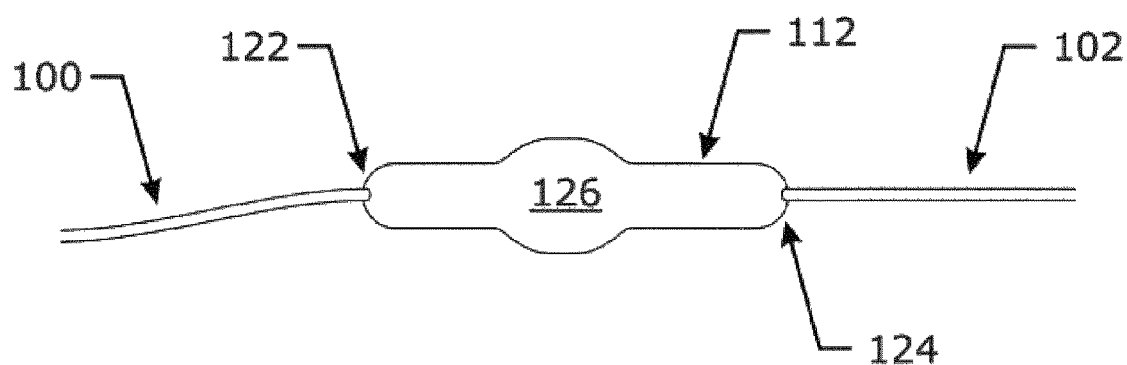
FIG. 2 shows a joint submitted to a heat treatment according to the invention.

FIG. 2 gives a schematical representation of a realized joint. More particularly, FIG. 2 shows the pressed ends 122 and 124 of the tubular metal connector 112 and the flattened central part 126. Typical dimensions in the finalized joint, i.e. after the flattening operations, are a total length $L_{tot}$ of 23.8 mm, a length $L_{center}$ of the flattened central part of 7.25 mm, a length of insertion of first superconducting wire of 7.9 mm and a length of insertion of second superconducting wire of 8.7 mm.

As already mentioned, and out of the context of joining two superconducting wires, the heat treatment can also be used to restore the superconductivity in $MgB_2$ wires where superconductivity was lost. Two examples below show how superconductivity was recovered in damaged samples.

Example 1. Compression

Reference samples of superconducting wires having a superconducting core of reacted $MgB_2$ and having a diameter of 0.75 mm were provided. The core of $MgB_2$ had been sintered at 700° C. during 30 minutes. The critical current, $I_c$, was measured at different temperatures. A linear regression was used to normalize the critical current values measured in different samples at different temperatures. Results obtained at respectively 25K, 20K and 15K are reported in table 1.

TABLE 1

Superconductivity test results obtained on different samples:

| Sample | Step 1 Temp., ° C. | time, min | Step 2 Temp., ° C. | time, min | Critical current Ic at 25K, A | Ic at 20K, A | Ic at 15K, A |
|---|---|---|---|---|---|---|---|
| REF 1 | 700 | 30 | n/a | n/a | 139 | 252 | 365 |
| REF 2 | n/a | n/a | n/a | n/a | 38 | 76 | 114 |
| COMP 1 | 900 | 30 | 650 | 30 | 68 | 90 | 113 |
| COMP 2 | 900 | 10 | 650 | 60 | 75 | 145 | 214 |
| INV 1 | 900 | 30 | 650 | 60 | 164 | 240 | 315 |
| INV 2 | 900 | 40 | 650 | 60 | 179 | 267 | 365 |

REF 1 in Table 1 refers to the reference sample.

A damage was introduced by subjecting the reference sample REF 1 to a compression under a press of 4 tonnes during 10 minutes. REF 2 refers to the damaged sample and shows a drop in the critical current values, indicating a loss of superconductivity.

REF 2 was then subjected to different heat treatments to recover superconductivity.

COMP 1 and COMP 2 in Table 1 refer to comparison samples that were deformed as for REF2, then subjected to a two-phase heat treatment with durations outside the range of the present invention.

As an example, the second phase was too short for the comparative sample COMP 1 to recover superconductivity, as shown by the remaining low $I_c$ values.

As a second example, superconductivity was only partially recovered in the comparative sample COMP 2 due to a too short duration of the first phase of the recovery heat treatment, as shown by the increased $I_c$ values, yet too low compared to the reference sample REF 1.

Samples INV 1 and INV 2 were deformed as for REF 2, then subjected to the two-phase heat treatment of the invention, i.e. with a first phase at 900° C. during 30 minutes or 40 minutes, followed by a second phase at 650° C. for 60 minutes.

Both samples INV 1 and INV 2 have recovered superconductivity, as shown in table 1 with $I_c$ values close to the original values measured in sample REF 1.

Example 2. Bending

Another sample not reported in Table 1, sample INV 3, was obtained, starting from REF 1 and bending it over a tube of diameter of 19 mm diameter and straightening it.

Another sample, sample INV 4 was obtained starting from REF 1 and bending it over a tube of 19 mm diameter and straightening it, then pressing it uniaxially to obtain a flat wire with a width over thickness (w/t) ration of 2.

Samples INV 3 and INV 4 were subjected to the recovery heat treatment of the invention, i.e. samples were subjected to a heat treatment of two phases, a first phase of heating at 900° C. during 30 minutes and a second phase of heating at 650° C. during 60 minutes.

During the first phase the deformed wires were heated at 900° C. during 30 minutes. In this first phase, the following reaction takes place:

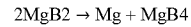
$$2MgB2 \rightarrow Mg + MgB4$$

During the second phase immediately following the first phase, the deformed wires were kept at a temperature of 650° C. during 60 minutes. During this second phase, the following reaction takes place:

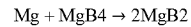
$$Mg + MgB4 \rightarrow 2MgB2$$

The critical current, $I_c$ was measured samples INV 3 and INV 4 after heat treatment, and the critical current was measured to be Ic=152 A at 25 K in both samples. This value was found to be close to the value measured in the reference sample REF 1 before deformation.

Additionally, a sample obtained in the same conditions as sample INV 3, i.e. by bending it over a tube of diameter of 19 mm diameter and straightening it, was heated at 900° C. for 4 hours, followed by heating at 850° C. for 41 hours. The critical current measured after this heat treatment was Ic=0 A, meaning that superconductivity was not recovered.

Although experiments have determined reasonable temperature and time ranges, the claimed temperature and time ranges may be wider, when executed on other equipment, for other chemical compositions.

A cable comprising a plurality of wires having a core of reacted $MgB_2$, wherein at least one wire is damaged, will recover superconductivity when subjected to the two phase heat treatment of the invention.

LIST OF REFERENCE NUMBERS

100 first superconducting wire
102 second superconducting wire
104 sheath of first superconducting wire
106 reacted $MgB_2$ inside first superconducting wire
108 sheath of second superconducting wire
110 reacted $MgB_2$ inside second superconducting wire
112 tubular metal connector
114 unreacted Mg powder and B powder
116 first end of tubular metal connector
118 second end of tubular metal connector
120 pressing tool
122 first pressed end of tubular metal connector
124 second pressed end of tubular metal connector
126 central pressed part of tubular metal connector

LIST OF ABBREVIATIONS IN FIGURES $L_1$ length of insertion of first superconducting wire
$L_2$ length of insertion of second superconducting wire
$L_{tot}$ length of the tubular metal connector
$L_{cr}$ critical length
$L_{center}$ length of pressure zone in central part of tubular metal connector

The invention claimed is:

1. A method of restoring superconductivity of a wire having a core of reacted $MgB_2$, said method comprising the following steps:
    subjecting said wire to a heat treatment of two phases, a first phase of heating in a range of 800° C. to 1000° C. during 20 minutes to 40 minutes and a second phase of heating in a range of 550° C. to 750° C. during 45 minutes to 75 minutes.

2. The method according to claim 1, wherein the wire contains multiple $MgB_2$ cores.

3. The method according to claim 1, wherein said wire has a circular cross section.

4. The method according to claim 3, wherein said wire has a diameter between 0.2 mm and 1.5 mm.

5. The method according to claim 1 wherein said wire has a profiled or square or rectangular cross section.

6. The method according to claim 5, wherein said wire is flattened and has a width to thickness ratio ranging from 1.1 to 10, preferably from 1.1 to 5.0.

7. A method of restoring superconductivity of a cable comprising a plurality of wires having a core of reacted $MgB_2$, said method comprising the following steps:
    subjecting said cable to a heat treatment of two phases, a first phase of heating in a range of 800° C. to 1000° C. during 20 minutes to 40 minutes and a second phase of heating in a range of 550° C. to 750° C. during 45 minutes to 75 minutes.

8. A method of restoring superconductivity in a joint of superconducting wires having a core of reacted superconducting $MgB_2$, said method comprising the following steps:
    subjecting said joint to a heat treatment of two phases, a first phase of heating in a range of 800° C. to 1000° C. during 20 minutes to 40 minutes and a second phase of heating in a range of 550° C. to 750° C. during 45 minutes to 75 minutes.

* * * * *